April 5, 1966  J. S. ANDEREGG, JR  3,244,895
SHAFT ENCODERS

Filed July 26, 1962  5 Sheets-Sheet 1

INVENTOR.
JOHN S. ANDEREGG, JR.
BY
*Weingarten, Dunbuch & Pendiacis*
ATTORNEYS

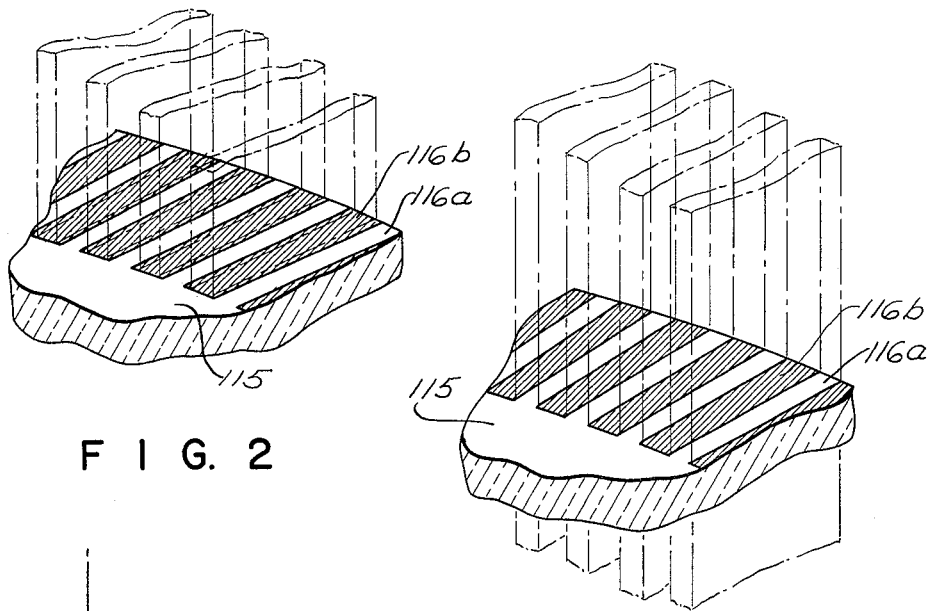
FIG. 2
FIG. 3
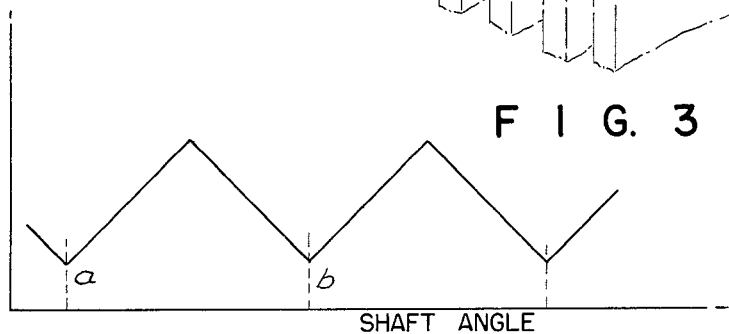
FIG. 4
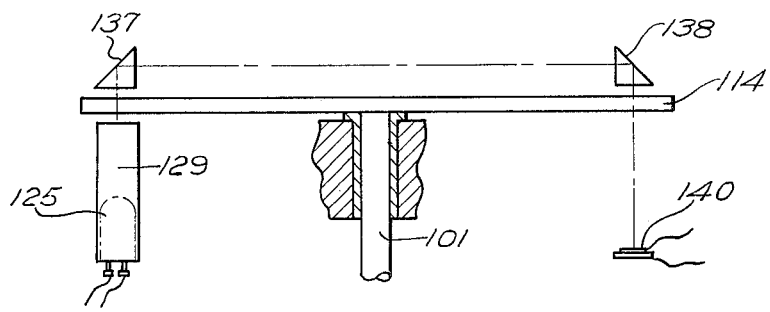
FIG. 5

April 5, 1966   J. S. ANDEREGG, JR   3,244,895
SHAFT ENCODERS
Filed July 26, 1962   5 Sheets-Sheet 3
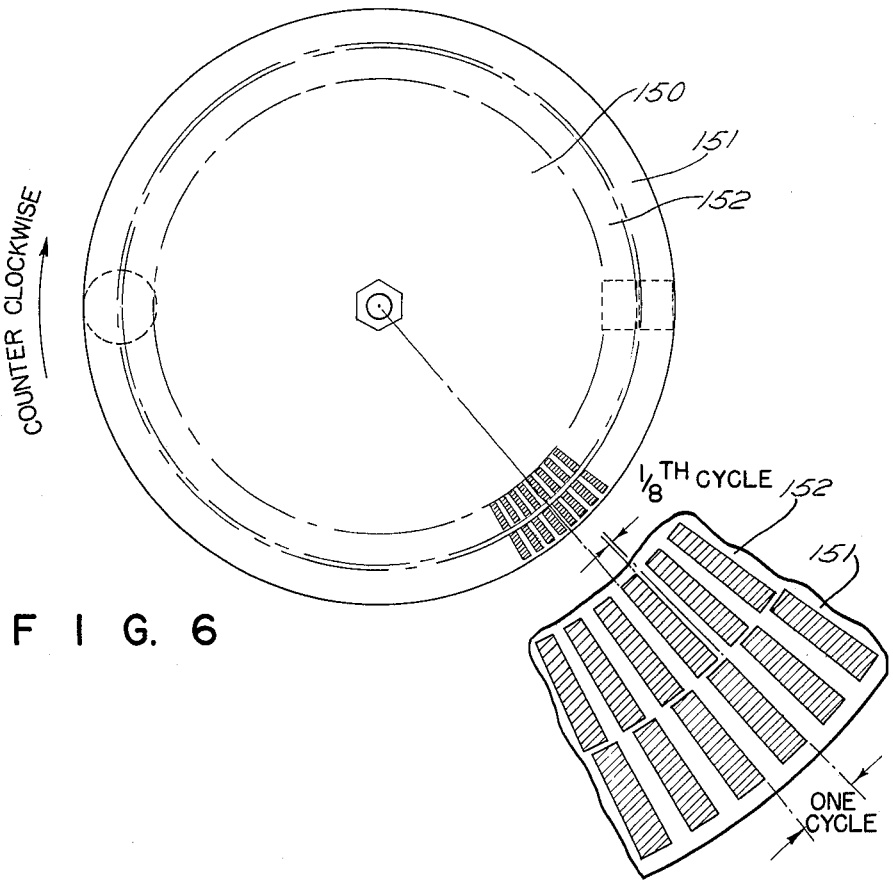
FIG. 6
FIG. 6A
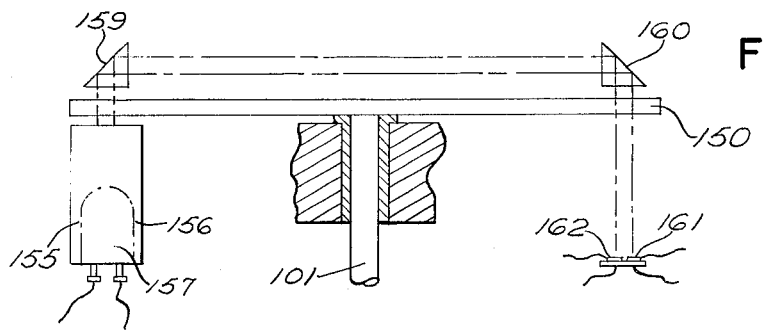
FIG. 7
INVENTOR.
JOHN S. ANDEREGG, JR.
BY
*Weingarten, Orenbuch & Pandiscio*
ATTORNEYS April 5, 1966 J. S. ANDEREGG, JR 3,244,895
SHAFT ENCODERS
Filed July 26, 1962 5 Sheets-Sheet 4

INVENTOR.
JOHN S. ANDEREGG, JR.
BY
Weingarten, Overlach & Pandiscio
ATTORNEYS

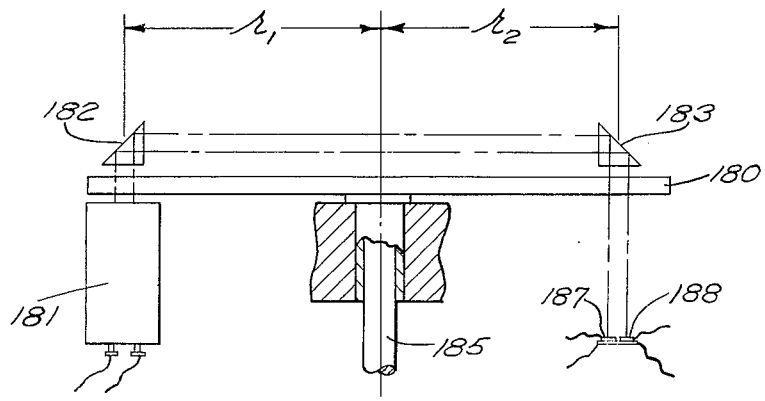
FIG. 10
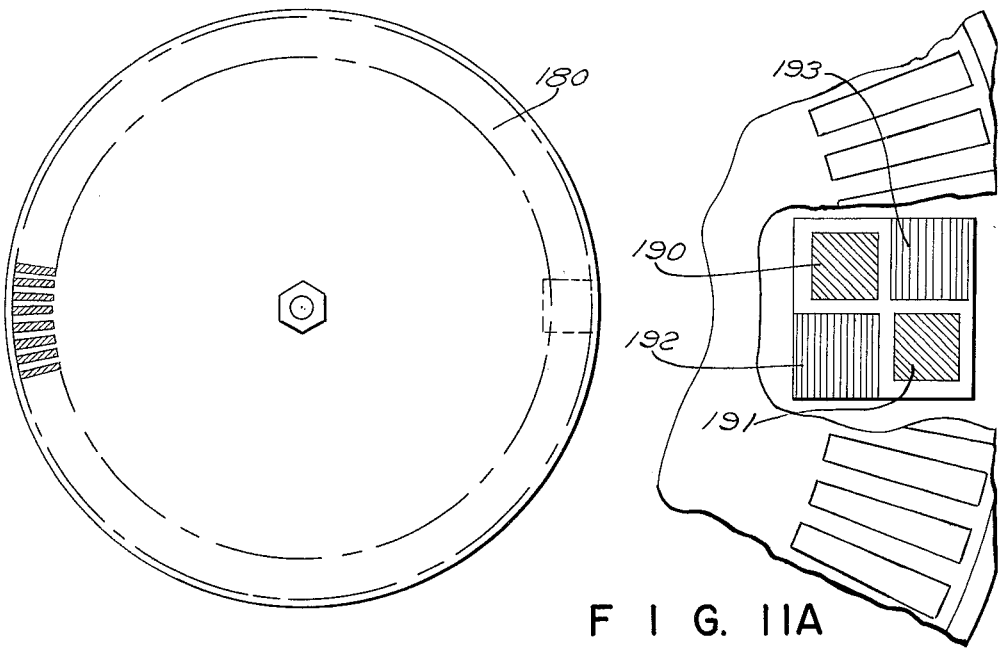
FIG. 11
FIG. 11A
INVENTOR.
JOHN S. ANDEREGG, JR.
BY
ATTORNEYS

United States Patent Office 3,244,895
Patented Apr. 5, 1966

3,244,895
SHAFT ENCODERS
John S. Anderegg, Jr., Bedford, Mass., assignor to Dynamics Research Corporation, Stoneham, Mass., a corporation of Massachusetts
Filed July 26, 1962, Ser. No. 212,535
5 Claims. (Cl. 250—236)

The present invention relates in general to the detection of angular motion, and more particularly concerns novel precision shaft angle encoders and shaft rotation sensing devices for measuring the magnitude and direction of angular displacements, with exceedingly high sensitivity.

Many techniques have been devised and many encoders are presently available for sensing the magnitude and relative direction of shaft rotation. One form of prior encoder, which is of particular interest in connection with the present disclosure, makes use of variable interference patterns generated in the optical path between a light source and a photosensor. A device utilizing these principles has been described in the publication Electromechanical Design, May 1958, pages 12–17, inclusive. Typically, the desired interference pattern is generated by a pair of concentrically mounted, closely-spaced circular discs each containing a radially oriented pattern of alternately spaced, transmissive and opaque sectors; one disc having, for example, one more opaque sector than the other. One of the discs is fixed while the other is rotated by the input shaft whose rotation is to be sensed.

By appropriately arranging a light source and a corresponding photosensitive element on opposite sides of the disc pair, this variable, moire, light interference pattern may be converted into electrical impulses. Thus, for a particular shaft position, maximum light will be transmitted through one area of the confronting discs, while upon angular rotation roughly equal to the width of one of the sectors, light transmission, and hence electrical output will be at a minimum in the same area.

It is demonstrated in the above-cited article that for shaft rotation through an angle equal to the width of one sector, the intereference pattern will rotate a full 360°. Thus, with $n$ sectors on one disc, and $n+1$, or $n-1$ sectors on the other, rotation of the input shaft through a full circle will cause the interference pattern to rotate $n$ times. By utilizing a number of photosensors spaced around the periphery of the discs, the sensitivity of the angular motion detection may be further enhanced. Design details are fully set forth in the noted publication.

It is appropriate here to observe that one advantage of this prior encoder is that the photosensing device need only respond to light intensity changes occurring in relatively large areas of the interference pattern; in particular, a single light source and photocell combination will cover many of the alternating opaque and transmissive lines. This, in turn, permits the use of relatively low intensity light sources and correspondingly, larger area, lower sensitivity photosensitive elements.

The prior encoder discussed above, while highly successful as a general purpose angular motion detector, has been inherently limited to applications where exceedingly high angular resolution is not essential. One of the problems presented in the design of such a device is the precision which must be maintained as the angular resolution is increased, the severe limitations being the accuracy with which the rotating disc may be made to rotate in its bearings and the close tolerance for disc spacing.

It may be shown that shaft translation of the order of tenths of thousandths of an inch can sharply limit the accuracy of the encoders. Such translation may be caused by shaft runout as well as lack of concentricity between the rotating shaft and the disc attached thereto. Mechanical tolerances required for an encoder of this type thus become impractical when high precision is required, and even if these tolerances were to be maintained notwithstanding cost, the result would be a device subject to misalignment and potential error in the absence of extreme care.

The present invention contemplates and has as a primary object the provision of a shaft angle encoder inherently capable of exceptionally high accuracy and angular resolution with reasonable tolerances, which encoder is capable of maintaining its precision over long periods notwithstanding environmental conditions.

Accordingly, to the basic principles of this invention, a rotatable disc, generally similar in form and structure to one of the two discs of the previously described encoder, is arranged in an optical system whereby two spaced portions of the single disc are effectively superimposed to achieve moire interference pattern. The optical system achieves the effect of two such discs rotating in relatively opposite directions and to this extent the result is identical to that achieved by the prior device which utilizes two independent discs. That is, the effective area where the two sectors of the same discs are superimposed, will, upon rotation of the disc, alternately transmit and block light so that a photosensitive arrangement may be incorporated to sense the variable light intensity. In this manner, the present invention converts shaft rotation into electrical impulses.

Through the utilization of but a single disc, many of the disadvantages of prior encoders utilizing interference patterns are immediately avoided. It is no longer necessary to adjust precisely two relatively rotatable elements for concentricity, and, as will be demonstrated below, such adjustments as are required in the use of the present invention are readily made. Since, as pointed out earlier, the effect of the optical system is to achieve sector patterns rotating in opposite directions upon rotation of the disc in but one direction, the result is one full electrical cycle for the rotation of approximately the angular width of a transmissive opaque sector. Thus, for a particular angular resolution as will further appear below, the present invention permits the use of only one-half the number of sectors required previously. Stated conversely, high angular resolution may be obtained for a disc prepared with a given number of spaced opaque and transmissive sectors.

Accordingly, to one embodiment of the invention, collimated light is passed through an area of the single disc, where it illuminates the sector pattern. This light from the object surface travels through two totally reflecting, right angle prisms and thereafter through another area of the same disc on the other side where the sector pattern is again encountered. When the transmissive sectors are aligned, the light beam transmitting the images of the first area passes through to a pickoff device, such as a photosensitive cell for generation of electrical signals, or onto a ground glass for visual reading. Conversely, when the opaque sectors coincide with the clear sectors, the light is substantially blocked from the pickoff device.

The same principle is used in another embodiment of the invention in which a lens system is inserted between the prisms in order to focus the image from one side of the disc onto the sector pattern of the other side. The sensing cell arrangement is much the same as before.

The present invention also permits a determination of the sense or direction of rotation. By using a disc with two concentric, similar patterns, the sectors on one track being displaced by one quarter of a sector from the sectors on the other, and by placing respective sensing cells beneath the images of the two tracks, a two phase output is obtained.

The direction may be obtained in other embodiments using a single track by non-equiradial positioning of detectors and transmitting the image from one side of the disc to a point which is not geometrically spaced 180° away.

It is, therefore, an object of the present invention to provide a compact angular encoder of high reliability, and low sensitivity to environment which produces exceptional resolution with great accuracy.

Another object is to provide an angular encoder which requires only one disc to achieve the effect of a variable moire interference pattern.

A further object is to provide an encoder having means for imaging a first distinctive portion of a disc on a second portion of the same disc to obtain a measure of incremental angle movement and sense.

An additional object is to provide a shaft encoder which minimizes errors due to translation, eccentricity, and miscentering of a member on a shaft.

Other features, objects, and advantages of the invention will become apparent from the following specification when read in connection with the accompanying drawing in which:

FIGS. 2 and 3 are detailed views of sections of the disc of the apparatus of FIG. 1 in which the light transmission is diagrammatically illustrated;

FIG. 4 is a graphical illustration of the average light intensity received at the detector of FIG. 1 as a function of shaft angle;

FIG. 5 is a diagrammatic view of an optical arrangement for an encoder in accordance with the principles of this invention;

FIG. 6 is a plan view of a disc carrying two tracks in accordance with the principles of this invention;

FIG. 6A is an enlarged view of one portion of the disc of FIG. 6;

FIG. 7 is a diagrammatic view of an optical system suitable for use with the disc shown in FIG. 6;

FIG. 10 is a diagrammatic view of an encoder in accordance with the principles of this invention in which direction sensing may be accomplished with a single track;

FIG. 11 is a plan view of another embodiment of the encoder of this invention;

FIG. 11A is a detailed view of a portion of the disc of the encoder of FIG. 11.

Figure 1:
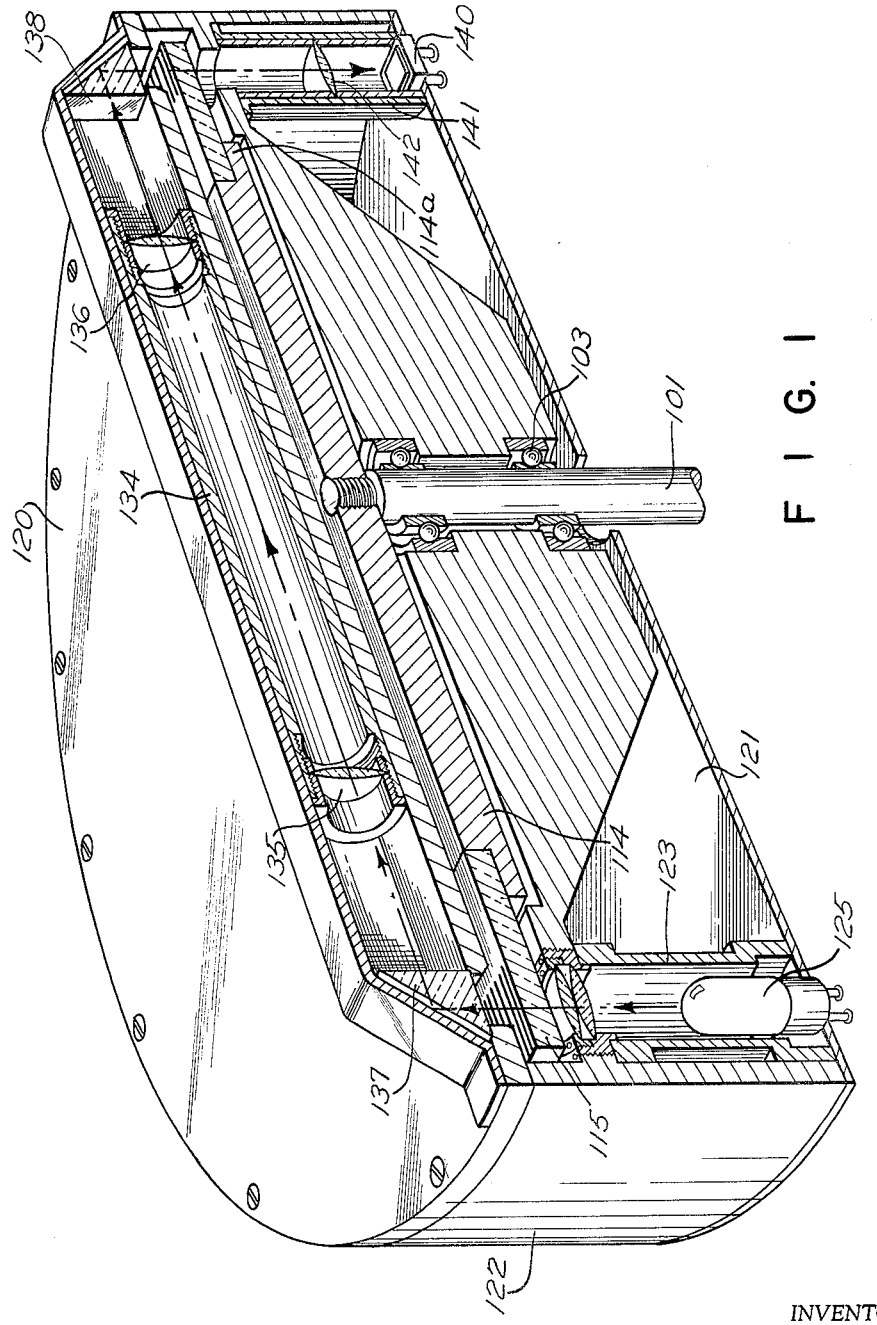
FIG. 1 is an illustration partly in perspective and partly in cross-sectional view of an encoder in accordance with the principles of this invention.

Referring now to the drawings, there is shown in FIGS. 1, 2 and 3 one embodiment of a shaft encoder, according to the present invention, for measuring the angle of shaft rotation. The encoder is mounted in a generally cylindrical housing having top and bottom walls 120 and 121 and a cylindrical side wall 122. Protruding through the bottom wall 121 is the shaft 101 whose angle of rotation is to be detected.

Mounted in the housing and driven by shaft 101 is a circular metallic disc 114 having a lip portion 114a along which is mounted an annular disc 115 preferably of glass, Lucite, or any similar light transmissive base. In actual practice, the metallic disc 114 and the light transmissive member 115 may be made entirely of light transmissive material if it is so desired.

A sector pattern prepared by photographic, photoengraving or other well-known process which permits mass production from a master pattern, having alternate transmissive and non-transmissive sectors, is placed on the transparent base member 115. While only a portion of the disc 115 is shown in FIGS. 1–3, it is understood, of course, that the sector pattern is continuous around the entire disc.

Referring again to FIGS. 1–3, a light source 125 is positioned on one side of the disc 115. The illumination from the source is directed by a lens system 130, 131 mounted within a cylindrical tube 123 upon the pattern on the disc.

Positioned on the side of the disc opposite the light source 125 are a pair of totally reflecting prisms 137, 138 whose function is to reflect the light passing through the disc 115 on the left-hand side onto the right-hand side of the disc as viewed in FIG. 1. In order to focus the light rays onto the right-hand side of the disc, a pair of lenses 135, 136 mounted in a cylindrical member 134 which is supported between top wall 130 and a cover plate 133, are used.

A sensing cell 140, positioned beneath the right side of disc 115, receives light passing through the right side of disc 115 when viewed in FIG. 1. The sensing cell has a sensitive area large enough to receive a light pattern including many sectors. The sensing cell is positioned at the end of a cylindrical tube 141 having a lens 142 mounted therein for focusing the light onto the sensing cell. Lens 142 may be omitted when the sensing element is positioned close to the disc 115.

Considering now the operation of the encoder of FIGS. 1–3, light rays from source 125 are projected through the portion of the disc 115 directly beneath prism 137 by the optical system 130, 131. Since the disc 115 contains a plurality of transparent and non-transparent sectors 116a and 116b, respectively, only the transparent sectors of the disc 115 will allow light rays to pass, thereby transmitting a pattern of light as shown at the top of FIGS. 2 and 3. The light thereupon strikes reflecting prism 138, whereupon the pattern formed by the light rays passes through focusing lens 135 and 136 before it strikes prism 138. In this embodiment it is the fact that there are an odd number of sectors which allows the creation of phase displaced signals from a single track using a pair of optical systems, each of which folds over the image of one portion of that track onto a second portion diametrically opposite to the first portion, both portions being radially equidistant from the axis.

Referring now to FIGS. 2 and 3, if the pattern of light emanating from the left side of the disc as shown in FIG. 1 strikes the right side of the disc when the non-transparent sectors are directly in the path of the pattern of light rays as shown in FIG. 2, a minimum of light will be transmitted through the disc. Conversely, as shown in FIG. 3, if the light from the left side of the disc strikes the right side of the disc when the transparent sectors are in the path of the pattern, a maximum amount of light will pass through the disc and will be detected by the sensing cell 140. The purpose of the lens 142 is to focus the moire interference pattern of light upon the sensing cell 140.

Therefore, the pattern of light striking the right side of the disc and passing through to the sensing cell 140 will vary from a minimum value as in FIG. 2 to a maximum as shown in FIG. 3.

Upon rotation of the shaft 101, the pattern of light passing through the disc 115 onto the sensing cell will vary in accordance with shaft position. The frequency of the light maxima and minima at the detector 140 is a function of speed of shaft rotation with the number of cycles for a disc of $n$ sectors being $2n$ for each revolution of the shaft.

The optical system of the present invention optically "folds" one side of the disc over upon the other side of the disc. The interference pattern thus obtained is identical to that which would be obtained if two identical discs were mounted concentrically and rotated in opposite directions. Hence, the relative speed of lines of the interference pattern is twice the shaft speed.

Referring now to FIG. 5, a modified form of the encoder illustrated in FIG. 1 is shown. In the apparatus described in FIG. 1, light from the lamp 125 was projected through one side of the disc and a lens system was used to transmit the image from the prism 137 to the other side of the disc and onto the detector. In the apparatus illustrated in FIG. 5, a collimating element 129 is placed over the lamp 125 such that light rays striking the left-hand side of the disc 114 are substantially parallel; thus, no lens system is required to transmit the image of the left-hand side of the disc across the disc through the right-hand side of the disc and onto the detector 140.

The problem in the above-identified devices is that the sectors must appear precisely radial with respect to the center of the disc so that the superposition will be precise. Fabrication of discs with precisely radial sectors is extremely difficult. To accomplish this, slightly non-radial sectors may be used, and the prisms adjusted by rotating them to a position where the effective superposition has precise alignment.

Referring now to FIG. 4, the average light intensity at the detector is shown as a function of shaft angle for the encoder of FIG. 1. The output wave form from the detector 140 will have the same shape as this variation in light intensity. One electrical cycle running from the minimum light intensity at point A to the minimum light intensity at point B, corresponds to a disc rotation of one sector. If one transparent plus one opaque sector is defined as one geometric cycle on the disc, then one geometric cycle generates two output electrical cycles. In the preceding discussion, the opaque and transparent sectors have been considered as essentially equal width sectors. In practice, this is usually not so. The opaque sectors are made somewhat larger than the transparent sectors in order to insure that, at the minimum points, light is more completely blocked out. This effect can be seen in the illustrations of FIGS. 2 and 3. In an apparatus of this type having $n$ pairs of opaque and transmissive sectors, one complete shaft revolution will then generate $2n$ electrical output cycles. Since each cycle contains a maximum and minimum value, each cycle can be considered to represent two states; hence, one complete shaft revolution will generate $4n$ changes of state. The angular revolution of the device is then $360°$ divided by $4n$. The electrical output from the detector 140 can be measured by any conventional electronic counting system with the number of counts being indicative of the shaft rotation.

While the encoder described above provides output information of the amount of shaft rotation, it does not provide information as to the direction of rotation. In order to obtain information as to the direction of rotation, a second wave form must be generated and the direction of rotation can then be determined by the phase relationship between the two wave forms. There are several ways in which these two wave forms may be generated. These may be considered in two categories, one category being the addition of a second track of sectors on the encoder disc with the sectors of the second track displaced with respect to the sectors on the first track. The other category utilizes only a single track but employs optical means to generate two images of one side of the disc in the "optical foldover" with the images being displaced when they are superposed on the opposite side of the disc.

Figure 8:
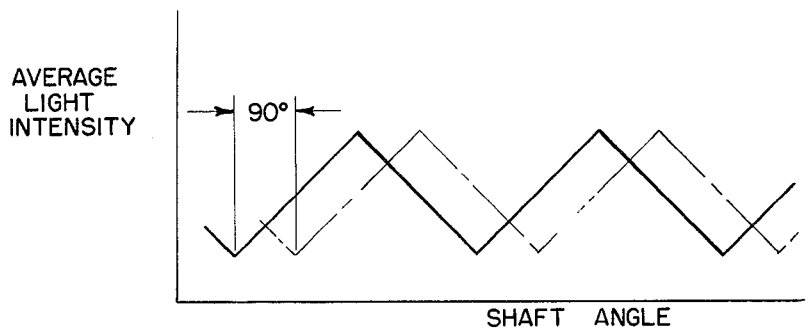
FIG. 8 is a graphical illustration of an average light intensity received by the detector of FIG. 7 as a function of shaft angle.

Referring now to FIG. 6, an encoder disc 150 is shown which has an outer track 151 of alternate transparent and opaque sectors and an inner track 152 of the same pattern. In FIG. 6a, an expanded view of a portion of the two tracks is shown. One geometric cycle includes one opaque and one transparent sector. The sectors on the inner track 152 are displaced in a counterclockwise direction by ⅛th of a geometric cycle with respect to the sectors on the outer track 151. The optical arrangement for an encoder employing the disc shown in FIG. 6 is illustrated in FIG. 7. A pair of collimators 155 and 156 provide two separate narrow beams of light from lamp 157 with the beam from collimator 155 being arranged to form an image of the outer track 151, while the beam from collimator 156 forms an image of the inner track 152. The two images are transmitted by means of prisms 159 and 160 to strike their respective tracks on the right-hand side of the disc 150. A pair of light detectors 161 and 162 are positioned beneath tracks 151 and 152 respectively to receive the transmitted light pattern. The average light intensity at each of these detectors is a function of shaft angle and is illustrated in FIG. 8, with the solid line representing the light intensity seen by one detector while the dotted line represents the other. The phase difference between the wave forms of FIG. 8 represents $90°$ in the output wave form since one electrical cycle is generated by rotational movement of one-half geometric cycle. The direction of rotation is determined by the relation of the wave forms from the two detectors. Thus, if the direction of rotation is counterclockwise, then the waveform from the detector 151 receiving the image from the outer track will lead the wave form from detector 162 representing the inner track. In this instance, the dotted line of FIG. 8 would represent the wave form from the outer track. If on the other hand, the direction of rotation were clockwise, the converse would be true and the wave form from the inner track would lead the wave form from the outer track.

Figure 9:
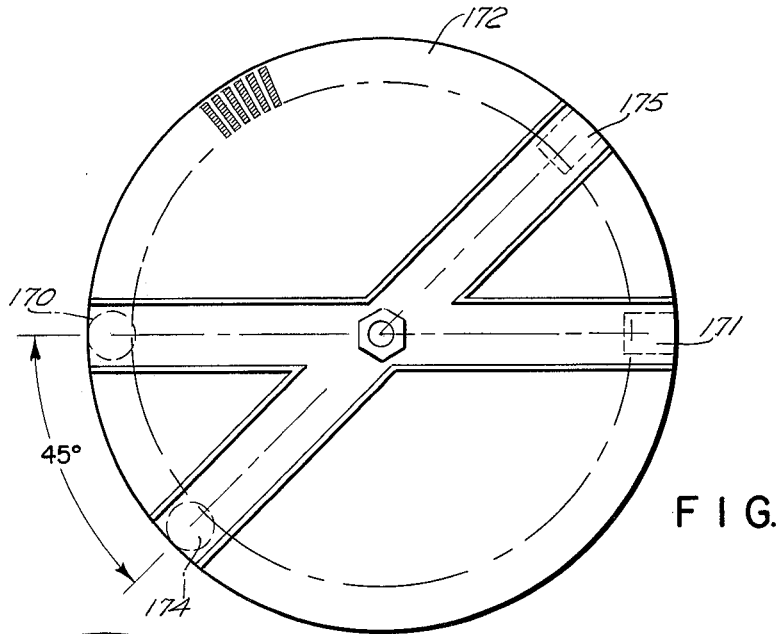
FIG. 9 is a plan view of another embodiment of an encoder suitable for producing the waveform of FIG. 8.

The wave form of FIG. 8 may also be generated with a single track. One apparatus for producing this waveform from a single track disc having an odd number of each type of sectors is shown in FIG. 9. In the encoder of FIG. 9, a first optical system consisting of the light source 170 and a detector 171 is placed along one diameter of the disc 172. A second optical system consisting of light source 174 and detector 175 is located on another diameter of the disc displaced $45°$ from the first diameter. Each of these optical systems have the general configuration shown in FIG. 5. Since the encoder disc has an odd number of transmissive and opaque sectors, then when an opaque sector is located directly over light source 174, a transmissive sector will be located exactly $180°$ away over detector 175. If now an optical system were placed on a diameter rotated $90°$ with respect to this initial optical path, this would correspond to a phase difference in waveform output of $180°$. The second optical path formed by light source 174 and a detector 175, which is displaced on the disc by $45°$, then generates a wave form which has a phase difference of $90°$ from the wave form generated by the light source 170—detector 171 combination. This phase difference leads or lags depending on the direction of rotation. The apparatus then of FIG. 9 also produces a direction sensitive output.

Still another apparatus for generating the wave form of FIG. 8 is shown in FIG. 10. In the apparatus of FIG. 10, a single track disc 180 is employed with a double collimator 181 with the collimation arranged such that one beam forms one image of a portion of the single track while the second beam, which is displaced tangentially from the first track forms a different image of the same track. The track sectors are formed with the sides of each sector parallel to radii of the disc, thereby forming a slight inward taper in each of the sectors. The images formed by the collimated beams from collimator 181 pass through the left side of disc 180 are transmitted by prisms 182 and 183. However, in this apparatus, prisms 182 and 183 are not equiradial from the center of the shaft 185. Thus, the radius $r_2$ between the center of prism 183 and the center of shaft 185 is somewhat shorter than the radius $r_1$ between the center of prism 182 and the shaft 185. The images from left-hand side of the disc 180 are incident, on the right-hand side of the disc 115, upon a portion of the track located closer in to the center of the disc. A pair of detectors 187 and 188 are placed beneath the right-hand side of the disc 180 and displaced tangentially with respect to one another. The wave form of average light intensity received at detector 188 will now be out of phase with the wave form of average light intensity received at detector 187. The amount of phase difference is a function of the ratio of radius $r_1$ to $r_2$, and the lead or lag of this phase difference is dependent upon the direction of rotation of the disc 180.

In FIG. 11, a modified version of the encoder of FIG. 10 is shown. In the modified form of the encoder shown in FIG. 11, the disc 180 again has a single track; however, four detectors 190, 191, 192, and 193 are used in the configuration shown in the detailed view of FIG. 11A. These detectors work in pairs with detectors 190 and 191 forming one pair while detectors 192 and 193 form another pair. The arrangement is such that a push-pull action is achieved by each pair with the phase relation between the outputs from each pair of detectors indicating the direction of rotation of the disc 180.

Another system in which direction sensing may be accomplished with a single track employs two glass blocks in the light path; one block is placed normal to the average direction of light, while the other block is rotated sufficiently to cause a displacement of the image by one-half of a sector. A pair of detectors are then placed underneath the right-hand side of the disc with one detector arranged to receive the light pattern resulting from the superposition of the image which has not been diverted by the glass block while the other detector receives the displaced image. This arrangement again provides wave forms in which the phase leads or lags dependent upon the direction of rotation. The glass block which is normal to the direction of light serves the purpose of compensating for the change in focal length introduced by the titled plate.

In the embodiments of the encoder of this invention described previously, the optical foldover arrangement has taken the form of an "overhead" optical transmission system along the diameter. Other optical arrangements may be utilized to perform this same function. Thus, in FIG. 12, an optical system is illustrated which includes a 90° bend in the horizontal plane. Such an arrangement permits the use of a through shaft, and decreases the axial length of the encoder.

Figure 12:
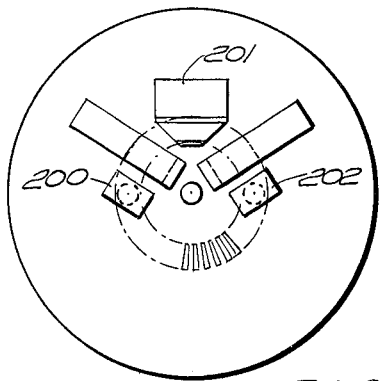
FIG. 12 is a diagrammatic view of an embodiment of the encoder of this invention in which the optical system is arranged not to pass over the axis of the encoder.

In the embodiment illustrated in FIG. 12, a right angle prism 200 reflects the image from the left-hand side into a roof prism 201, which then reflects the image onto a second right angle prisms 202. The image is then projected through the right-hand side of the disc onto the sensing element (not shown).

Having described the invention, various modifications and departures will now become apparent to those skilled in the art, and the invention herein should be construed as limited only by the spirit and scope of the appended claims.

What is claimed is:

1. Apparatus for sensing the rotation of a shaft comprising; a disc mounted on said shaft and rotatable with said shaft, a plurality of alternately energy transmissive and non-transmissive sectors circumferentially disposed on said disc, the number of energy transmissive sectors being an odd number and the number of energy non-transmissive sectors being an odd number; a first means for projecting light energy through a first portion of said disc and a first light impinging means for impinging light energy transmitted through said first portion of said first disc onto a second portion of said disc diametrically disposed with respect to said first portion of said disc, a first sensor element adapted to respond to light energy transmitted through said first and second portions of said disc and to provide an output signal indicative of the amount of light transmitted; a second projecting means for projecting light through a third portion of said disc; said third portion being displaced in said disc from said first portion by 45°; a second light impinging means for impinging said light energy transmitted through said third portion of said disc onto a fourth portion of said disc diametrically disposed with respect to said third portion of said disc; second sensor means adapted to respond to light energy transmitted through said third and said fourth portions of said disc and to provide an output signal indicative of the amount of light energy transmitted through said third and said fourth portions of said disc.

2. Apparatus for sensing rotation of a shaft comprising; a disc adapted to be mounted on said shaft and be rotatable with it; a circular track formed on said disc and disposed concentrically with the center of rotation of said disc, said track being formed of a plurality of alternately energy transmissive and non-transmissive sectors; a light projecting source adapted to project light energy through a first portion of said disc including a plurality of said sectors; imaging means adapted to image the light energy transmitted through said first portion onto a second portion of said disc, said second portion being located a radial distance from the center of rotation of said disc different from the radial distance of location of said first portion; first and second sensor elements disposed beneath said second portion of said disc, said first sensor element being adapted to respond to light transmitted through a first area of said second portion of said disc and said second sensor element being adapted to respond to light energy transmitted through a second area of said second portion of said disc, said second area being tangentially displaced with respect to said first area of said second portion of said disc.

3. Apparatus in accordance with claim 2 and including third and fourth sensor elements, said third sensor element being disposed with respect to said first sensor element such that when said light energy received by said first sensor element is a maximum, said light energy received by said third sensor element is a minimum, said fourth sensor element being disposed with respect to said second sensor element such that when said light energy received by said second sensor element is a maximum, said light energy received by said fourth sensor element is a minimum.

4. Apparatus for sensing the amount and direction of rotation of a shaft comprising; a disc adapted to be mounted on said shaft and be rotatable with it; a circular track on said disc disposed concentrically with the center of rotation of said disc, said track being formed of a plurality of alternately energy transmissive and non-transmissive sectors; a light source for projecting light energy through a first portion of said disc including a plurality of said sectors; imaging means for imaging the light energy transmitted through said first portion onto a second portion of said disc, said second portion being located at a radial distance from the center of rotation of said disc different from the radial distance of location of said first portion; first and second sensor elements disposed beneath said second portion of said disc, said first sensor element being adapted to respond to light transmitted through a first area of second portion of said disc and said second element being adapted to respond to light energy transmitted through a second area of said second portion of said disc.

5. An electromechanical transducer comprising: a rotatable disc having a plurality of sectors alternately transmissive and non-transmissive to radiant energy disposed circumferentially around said disc forming one track thereon; a source for projecting light through first and second portions of said track; imaging means for imaging the light transmitted through said first and second portions of said track onto third and fourth portions of said track; a first light sensing device responsive to light transmitted through both said first and said third portions providing an output indication of the quantity of light received by it; a second light sensing device responsive to light transmitted through said second and said fourth portions for providing an output indication of the light received by it; said third and fourth portions being displaced from one another and disposed in respect to said first and said second portions such that the difference between the output indication from said first light sensing device and the output indication from said second light sensing device is indicative of the direction and amount of rotation of said rotatable disc.

References Cited by the Examiner

UNITED STATES PATENTS

| | | | |
|---|---|---|---|
| 3,046,541 | 7/1962 | Knox | 88—14 |
| 3,054,901 | 9/1962 | Davidson | 88—14 |
| 3,114,046 | 12/1963 | Cabaniss et al. | 250—233 |

FOREIGN PATENTS 782,831   9/1957   Great Britain.

RALPH G. NILSON, *Primary Examiner.*

WALTER STOLWEIN, *Examiner.*